Dec 30, 1924.

W. C. STEVENS

TREAD BUFFING MACHINES

Filed Aug. 24, 1920  3 Sheets-Sheet 1

1,521,582

INVENTOR
William C. Stevens
BY
ATTORNEY

Dec. 30, 1924.

W. C. STEVENS

TREAD BUFFING MACHINES

Filed Aug. 24, 1920

INVENTOR
William C. Stevens
BY G. C. Ely
ATTORNEY

Patented Dec. 30, 1924.

1,521,582

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

TREAD-BUFFING MACHINE.

Application filed August 24, 1920. Serial No. 405,706.

*To all whom it may concern:*

Be it known that I, WILLIAM C. STEVENS, a citizen of the United States, residing at Akron, in the county of Summit and State of Ohio, have invented certain new and useful Improvements in Tread-Buffing Machines, of which the following is a specification.

It is necessary in the preparation of forming pneumatic tires, especially in "two-cure" tires, to cement the tread portion to the carcass after each has received a semi-cure. In receiving the semi-cure, the surface of the tread strips becomes smooth and coated with a film of soapstone to which the cement does not adhere satisfactorily, and it is necessary to roughen the under surface of the tread strips to make the cement stick and successfully build a tire. I have devised special machines for buffing the under surface of the tread strip and my present invention is an improvement in apparatus of this type.

An object of this invention is to provide a means for holding the entire surface width of the tread strip against the buffing wheel. As the tread is often formed with raised irregular designs, it is beneficial to provide a support adapted to yield in the several places over which these irregular portions pass, and as the non-skid projections are on the side of the band away from the buffing device, it is necessary to provide means for exerting pressure on the lower portions of the tread band to force it against the buffing device so that all of the under surface of the band will be buffed equally.

Other objects or features of the invention will be more fully set forth in the following description and the accompanying drawings, and will be pointed out in the annexed claims.

Figure 1:
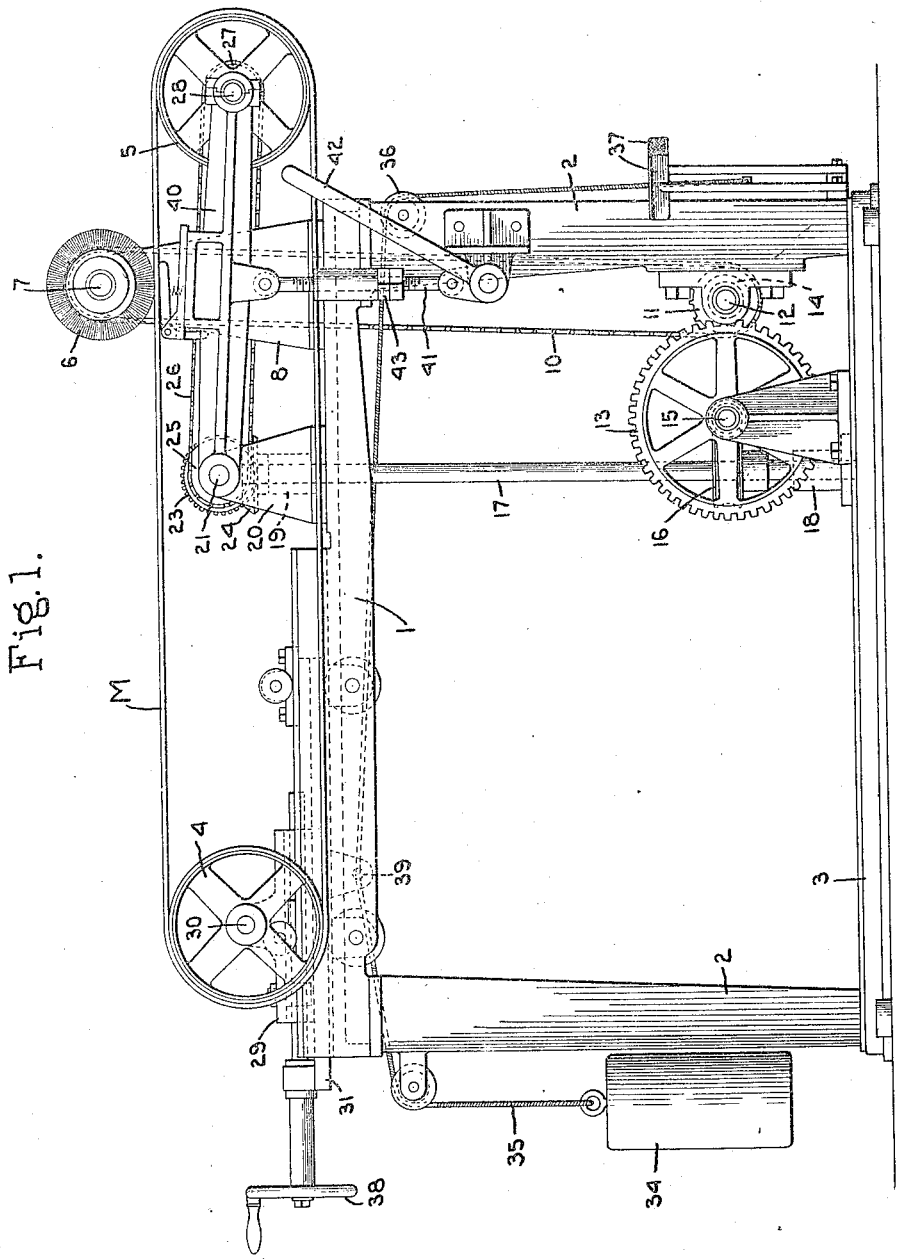
Fig. 1 is a side elevation of a buffing machine embodying the preferred form of my invention.
Figure 2:
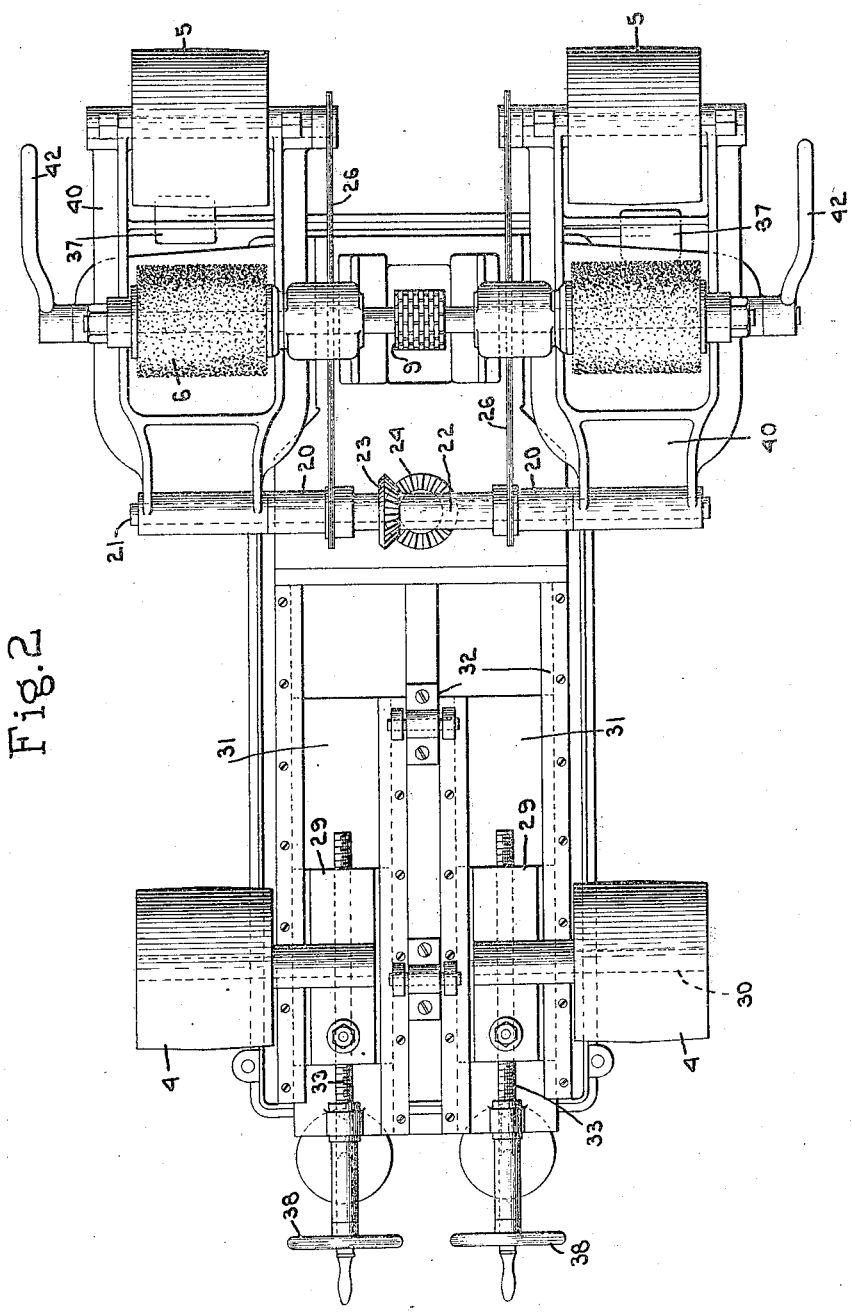
Fig. 2 is a plan view thereof.
Figure 3:
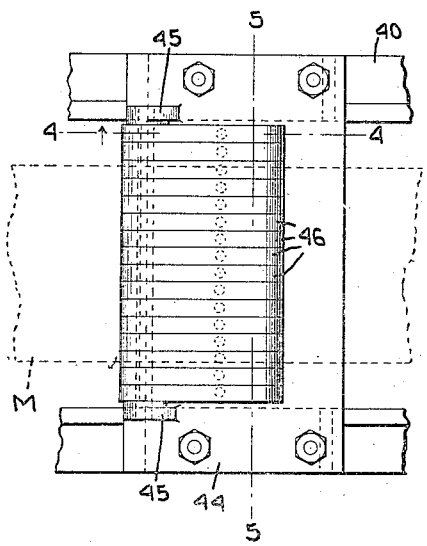
Fig. 3 is a fragmentary plan view of the yieldable tread supporting element.

The invention is illustrated herein as applied to a machine for buffing tread strips, but it will be understood that the invention may be embodied in machines for buffing many types of articles.

In the present invention I make the machine with two of the apparatus driven from the same power; and so constructed, they comprise a unit of two tread buffing machines taking up very little floor space. As both of the apparatus are similar in construction, one only will be described.

As illustrated in the drawings, the operative parts of the machine are carried by a frame or table 1 supported on legs 2, attached to a bed plate 3.

The tread strip M is rotatably carried by a pair of pulleys 4 and 5 under a buffing wheel 6 on a shaft 7 journaled in a bracket 8 on the frame 1. Also on the shaft 7 is a sprocket 9 over which is trained a chain 10 from a sprocket wheel 11 on the main drive shaft 12 which is operated from any suitable source of supply. Means for rotating the pulley 5 is shown in a gear 13 in mesh with a pinion 14 on the shaft 12, the gear 13 rotating the worm shaft 15, in engagement with a worm wheel 16 on a vertical shaft 17 mounted in bearings 18 and 19 on the base plate 3 and the frame 1 of the machine. Mounted on the frame 1 is a bracket 20 supporting the shaft 21 upon which is rotatable a sleeve 22 carrying a bevel gear 23 in mesh with a second bevel gear 24 on the upper end of the shaft 17. Sleeve 22 also carries a sprocket 25 and chain 26 connected to a sprocket 27 on the shaft 28 of the pulley 5.

It is intended to have the pulley 4 slidable on the frame in order to facilitate placing the tread strip on the pulleys. The shaft 30 of the pulley 4 is secured in an adjustable sliding block 29, which is mounted on the slide 31, movable in guideways 32 on the top of the frame 1. The block 29 is adjusted, with relation to the slide 31, by a screw 33 having a bearing in a boss on the slide 31 and a hand wheel 38 at its end. The purpose of the adjustment of the pulley 4 is to adapt the machine to tread strips of different sizes. The slide and pulley 4 are normally held rearwardly from the pulley 5 by a counter-weight 34. Weight 34 is attached to the slide 3 by a cable cord 35 at 39, the cord extending forward over a sheave 36 to a foot treadle 37. When it is desired to place a tread strip on the machine, the foot-treadle 37 is depressed to bring the pulleys closer together, which facilitates operation, after which the treadle is released and the weight retracts the slide 31 and tightens the strip M on the pulleys 4 and 5.

The forward pulley 5 is carried beneath the buffing wheel 6 on a bifurcated swinging arm 40, pivoted on the shaft 21, and centrally connected below the wheel 6, to a toggle joint 41 operated by a hand lever 42. At the time of placing a thread M on the pulleys, the toggle is broken, which lowers the arm 40 from the buffer wheel. One of the toggle links is adjustable at 43 to vary the height of the arm at will.

Figure 4:
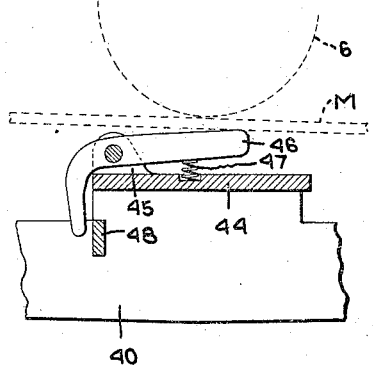
Fig. 4 is a sectional view taken on line 4—4, Fig. 3.
Figure 5:
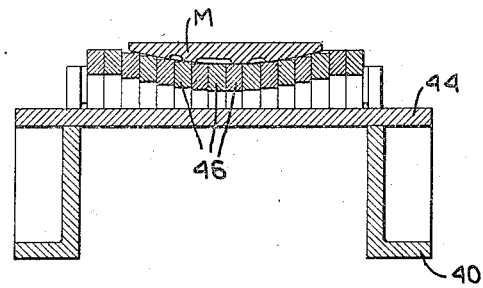
Fig. 5 is a sectional view taken on line 5—5, Fig. 3.

Directly below the buffer wheel 6, attached to the pivotal arm 40, is the thread-supporting plate 44, to one side of which is pivoted in lugs 45 a plurality of spring-pressed fingers 46, springs 47 forcing the fingers upward. The fingers are adapted to engage the irregular tread surface, the tread strip being reversed when on the buffing machine, and force the strip up against the bristles of the buffer. Each finger works independently of the other and it can be seen from an inspection of Figs. 4 and 5 that all portions of the tread will be made to contact the buffing wheel. The fingers 46 are provided with downwardly extending projections which engage a web 48 of the arm 40 to limit their movement.

The operation of this apparatus will be apparent from the foregoing description, it is simple and it efficiently accomplishes its functions even in the hand of an unskilled operative. To roughen or buff the under side of a tread strip, it is first turned inside out. The foot treadle is then depressed to bring the pulleys 4 and 5 together and the tread strip is slipped over them. Releasing the treadle, the counter weight will separate and tighten the strip M on the pulleys. The hand lever 42 is then operated to straighten the toggle joint 41 to bring the surface of the tread strip against the buffing wheel. As designed in this selected embodiment of my invention, the tread strip is moved slowly in one direction while the buffing wheel turns in the opposite direction at a high rate of speed.

It will be understood that the embodiment of the invention disclosed herein is illustrative and not restrictive and that various modifications in structure and arrangement of parts may be made within the spirit and scope of the following claims.

I claim:

1. In a machine for buffing semi-cured elastic tread strips, having one surface provided with irregular projections and depressions, means for supporting and propelling said strip, yielding means adapted to exert tension on the strip, a buffing wheel bearing against the smooth surface of said strip and a pressure device bearing against the rough surfaces beneath the buffing wheel, said pressure device comprising a plurality of independently operated spring pressed fingers.

2. In a machine of the character set forth, the combination of a buffing wheel, a pair of revoluble supports intended to receive a strip of material, one of said supports having a toggle-joint connection to raise and lower it with respect to the buffing wheel, and operating means attached to said toggle-joint.

3. A machine for buffing treads comprising a base, a pair of revoluble supports for said strips mounted thereon, a buffing wheel, means for bringing said revoluble supports together to allow the positioning of the tread strip, means for separating said supports and a yielding device connected to one of said supports to exert tension on said tread band.

4. A machine adapted for buffing tread bands comprising, a support, a buffing device upon the support, and means for supporting and feeding a band against the device adapted to exert a yielding tension on the band, said means being adjustable toward and from the buffing device.

5. A machine adapted for buffing tread bands comprising, a support, a buffing element on the support, means for supporting and feeding a tread band against the element adapted for adjustment toward and from said element, and a series of independently operating devices adapted to force the band against the buffing element throughout its width.

WILLIAM C. STEVENS.